US009709741B2

(12) United States Patent
Yang et al.

(10) Patent No.: US 9,709,741 B2
(45) Date of Patent: Jul. 18, 2017

(54) INVERSE TAPER WAVEGUIDES FOR LOW-LOSS MODE CONVERTERS

(71) Applicant: Futurewei Technologies, Inc., Plano, TX (US)

(72) Inventors: Li Yang, San Jose, CA (US); Huapu Pan, San Jose, CA (US); Qianfan Xu, Denver, CO (US); Dawei Zheng, Irvine, CA (US); Xiao Shen, San Bruno, CA (US)

(73) Assignee: Futurewei Technologies, Inc., Plano, TX (US)

( * ) Notice: Subject to any disclaimer, the term of this patent is extended or adjusted under 35 U.S.C. 154(b) by 66 days.

(21) Appl. No.: 14/700,892

(22) Filed: Apr. 30, 2015

(65) Prior Publication Data

US 2015/0316720 A1 Nov. 5, 2015

Related U.S. Application Data

(60) Provisional application No. 61/986,517, filed on Apr. 30, 2014.

(51) Int. Cl.
*G02B 6/12* (2006.01)
*G02B 6/14* (2006.01)
(Continued)

(52) U.S. Cl.
CPC ............. *G02B 6/14* (2013.01); *G02B 6/1228* (2013.01); *G02B 6/132* (2013.01); *G02B 6/136* (2013.01); *G02B 6/305* (2013.01)

(58) Field of Classification Search
None
See application file for complete search history.

(56) References Cited

U.S. PATENT DOCUMENTS 6,108,478 A * 8/2000 Harpin ................. G02B 6/1228 385/129
6,229,947 B1 * 5/2001 Vawter ................. G02B 6/1228 385/131

(Continued)

FOREIGN PATENT DOCUMENTS

EP 1400822 A2 3/2004

OTHER PUBLICATIONS

Foreign Communication From a Counterpart Application, PCT Application No. PCT/US2015/028538, International Search Report dated Jul. 13, 2015, 4 pages.

(Continued)

*Primary Examiner* — Tina Wong
(74) *Attorney, Agent, or Firm* — Conley Rose, P.C.

(57) ABSTRACT

An apparatus comprises a substrate comprising a silicon dioxide (SiO2) material disposed on top of the substrate, a silicon waveguide comprising a first adiabatic tapering and enclosed in the silicon dioxide material, and a low-index waveguide disposed on top of the substrate and adjacent to the first adiabatic tapering. A mode converter fabrication method comprises obtaining a mode converter comprising a substrate, a silicon waveguide disposed on the substrate and comprising a sidewall and a first adiabatic tapering, and a hard mask disposed on the silicon waveguide and comprising a silicon dioxide (SiO2) layer, wherein the hard mask does not cover the sidewall, and oxidizing the silicon waveguide and the hard mask, wherein oxidizing the silicon waveguide and the hard mask encloses the silicon waveguide within the silicon dioxide layer.

18 Claims, 12 Drawing Sheets

400 402 404 406 408 410 416 418 470 480 482 490 492
Low-Index Waveguide
Si Waveguide

(51) Int. Cl.

| | |
|---|---|
| ***G02B 6/136*** | (2006.01) |
| ***G02B 6/132*** | (2006.01) |
| ***G02B 6/30*** | (2006.01) |
| ***G02B 6/122*** | (2006.01) |

(56) References Cited

U.S. PATENT DOCUMENTS

| | | | | | |
|---|---|---|---|---|---|
| 6,310,995 | B1 * | 10/2001 | Saini | B82Y 20/00 | 385/28 |
| 6,571,039 | B1 * | 5/2003 | Al-hemyari | G02B 6/1228 | 385/131 |
| 6,801,692 | B2 * | 10/2004 | Nishimura | G02B 6/305 | 385/43 |
| 7,079,727 | B1 * | 7/2006 | Little | G02B 6/132 | 385/130 |
| 7,103,245 | B2 * | 9/2006 | Lee | G02B 6/10 | 385/28 |
| 7,251,406 | B2 * | 7/2007 | Luo | G02B 6/1228 | 385/129 |
| 7,359,593 | B2 * | 4/2008 | Little | G02B 6/1228 | 385/28 |
| 7,469,084 | B2 * | 12/2008 | Aalto | G02B 6/125 | 385/130 |
| 7,583,869 | B2 * | 9/2009 | Kang | H01S 5/026 | 385/129 |
| 8,170,383 | B2 * | 5/2012 | Tokushima | G02B 6/1228 | 385/14 |
| 9,268,089 | B2 * | 2/2016 | Heideman | G02B 6/1228 | |
| 2003/0053756 | A1 * | 3/2003 | Lam | G02B 6/1228 | 385/49 |
| 2003/0174956 | A1 * | 9/2003 | Viens | G02B 6/1228 | 385/43 |
| 2004/0017976 | A1 * | 1/2004 | Luo | G02B 6/1228 | 385/43 |
| 2004/0037497 | A1 | 2/2004 | Lee | | |
| 2005/0123244 | A1 * | 6/2005 | Block | G02B 6/1221 | 385/43 |
| 2009/0297093 | A1 | 12/2009 | Webster et al. | | |
| 2010/0266288 | A1 * | 10/2010 | Little | G02B 6/1228 | 398/139 |
| 2012/0321244 | A1 * | 12/2012 | Suzuki | G02B 6/305 | 385/14 |

OTHER PUBLICATIONS

Foreign Communication From a Counterpart Application, PCT Application No. PCT/US2015/028538, Written Opinion dated Jul. 13, 2015, 5 pages.

Fang, et al., "Suspended Optical Fiber-to-Waveguide Mode Size Converter or Silicon Photonics," Optical Society of America, Optics Express, vol. 18, No. 8, Apr. 12, 2010, pp. 7763-7769.

Takei, et al., "Silicon Knife-Edge Taper Waveguide for Ultralow-Loss Spot-Size Converter Fabricated by Photolighography," Applied Physics Letters, vol. 102, 2013, 5 pages.

Frish, et al., "Coupling of Single Mode Fibers to Planar Si Waveguides Using Vertically Tapered Mode Converters," Confluent Photonics, 2002, 12 pages.

* cited by examiner

INVERSE TAPER WAVEGUIDES FOR LOW-LOSS MODE CONVERTERS

CROSS-REFERENCE TO RELATED APPLICATIONS

The present application claims priority to U.S. Provisional Application No. 61/986,517 filed Apr. 30, 2014 by Li Yang, et al., and entitled "Method of Making a Narrow-Width Tip for Optical Couplers," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A mode converter is a photonic device that is configured to convert an optical mode between a first mode size and a second mode size. Mode size refers to the dimension of a mode in an optical waveguide in a certain direction, for example, the energy distribution in the transverse direction. Mode shape refers to the relative dimension of the mode size in two different directions, for example, a horizontal direction and a vertical direction. Due to the small mode size (e.g., sub-micro) of silicon waveguides it is challenging for mode converters to couple light into and/or out of silicon-based photonic devices. An existing method transfers the optical mode in a silicon waveguide to a large-size (e.g., with a mode diameter from about 1 micrometer (μm) to about 15 μm) low-index (e.g., an index from about 1 to about 3.4) waveguide using silicon inverse taper structures to increase a mode size. Another method uses inverse taper structures to increase the mode size by expanding the mode to a low-index cladding. However, these methods require a silicon waveguide with a small tip. Creating a tip width that is less than 100 nanometer (nm) in a standard 200 millimeter (mm) fabrication process is difficult due to lithography limitations. Current methods for creating a silicon waveguide with a small tip include using vertical tapering and knife-edge tapering. However, these silicon waveguides suffer from complicated and a non-controllable process.

SUMMARY

In one embodiment, the disclosure includes an apparatus comprising a substrate comprising a silicon dioxide (SiO2) material disposed on top of the substrate, a silicon waveguide comprising a first adiabatic tapering and enclosed in the silicon dioxide material, and a low-index waveguide disposed on top of the substrate and adjacent to the first adiabatic tapering.

In another embodiment, the disclosure includes a mode converter fabrication method comprising obtaining a mode converter comprising a substrate, a silicon waveguide disposed on the substrate and comprising a sidewall and a first adiabatic tapering, and a hard mask disposed on the silicon waveguide and comprising a silicon dioxide (SiO2) layer, wherein the hard mask does not cover the sidewall, and oxidizing the silicon waveguide and the hard mask, wherein oxidizing the silicon waveguide and the hard mask encloses the silicon waveguide within the silicon dioxide layer.

In yet another embodiment, the disclosure includes a mode converter fabrication method comprising fabricating onto a substrate a silicon waveguide that comprises a first adiabatic tapering and a sidewall, wherein a hard mask is disposed on the silicon waveguide and does not cover the sidewall, and wherein the hard mask comprises silicon dioxide (SiO2) material, fabricating a second waveguide onto the substrate, wherein the second waveguide comprises a second hard mask enclosing the second waveguide, and oxidizing the silicon waveguide and the second waveguide until the silicon waveguide is enclosed within the silicon dioxide material.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for creating silicon inverse taper waveguides that comprise a small tip using thermal oxidation processes. These silicon inverse taper waveguides can be used to convert between a small-size mode and a large-size mode while reducing coupling losses. In an embodiment, the top surface of the silicon inverse taper waveguide is protected by a hard mask while the sidewalls of the silicon inverse taper waveguide are exposed for oxidation, for example, thermal oxidation. Oxidizing the silicon inverse taper waveguide provides a protection layer for the silicon inverse taper waveguide, which substantially prevents the tip from contamination or mechanical damage. Further, the oxidation process may improve the surface roughness of the silicon inverse taper waveguide, which may further reduce propagation losses. Previously oxidation has not used for silicon waveguides because of design and implementation challenges. For example, oxidizing silicon waveguide is challenging to integrate into fabrication processes. Further, it is challenging to fabricate small features like a silicon waveguide tip without reducing the feature size of other waveguides and components.

Figure 1:
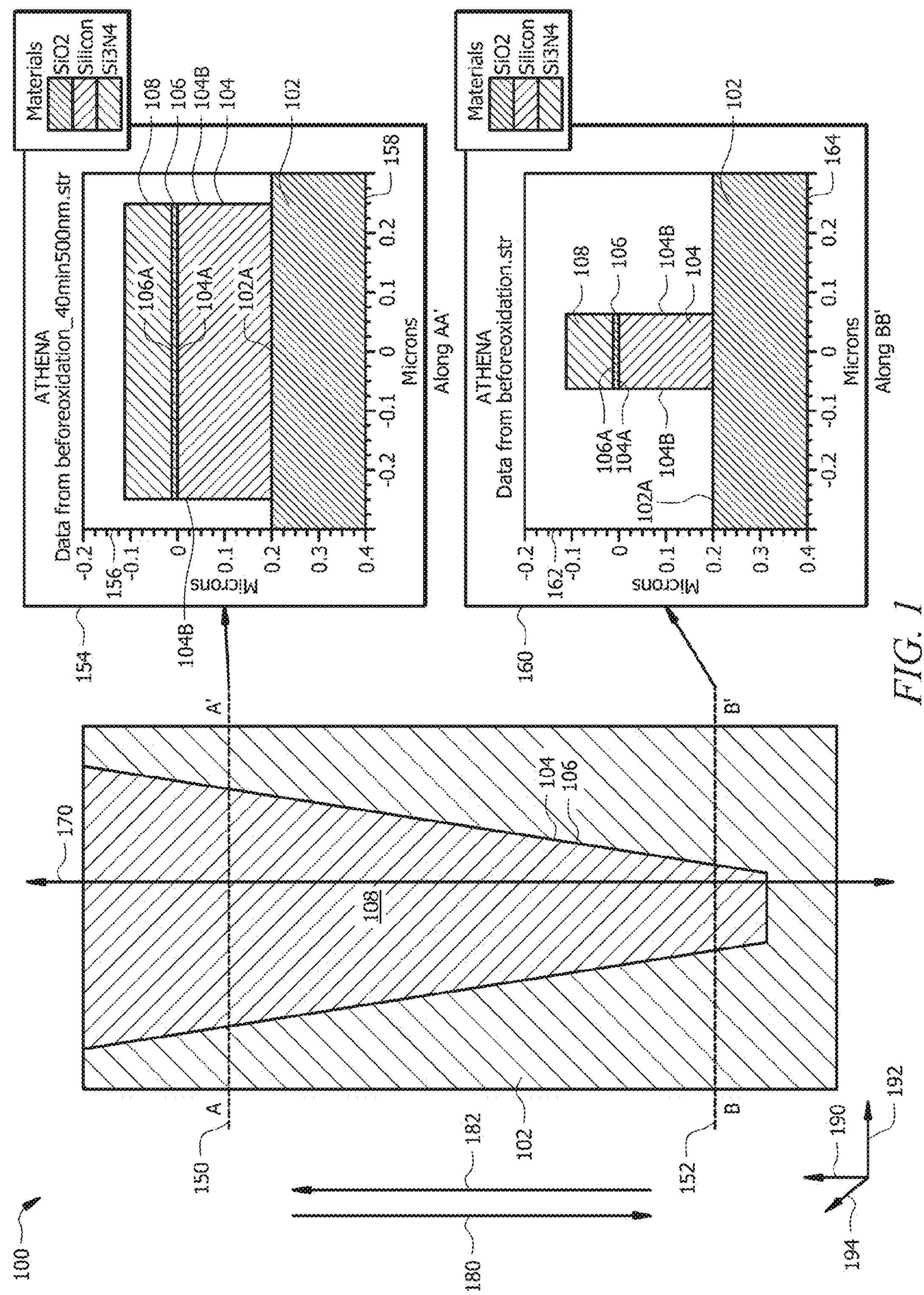
FIG. 1 is a top view of an embodiment of a mode converter before thermal oxidation.

FIG. 1 is a top view of an embodiment of a mode converter 100 before thermal oxidation. Mode converter 100 is configured to communicate light 170 along a silicon waveguide 104 and to transfer an optical mode of the light 170 between the silicon waveguide 104 and another waveguide (not shown). Mode coupler 100 is configured to transfer an optical mode in the first direction 180 to convert the optical mode to a larger optical mode. Converting an optical mode to a larger optical mode may be used in applications such as converting an optical mode from a waveguide to a fiber. Mode coupler 100 is also configured to transfer the optical mode of light 170 in a second direction 182 to convert the optical mode to a smaller optical mode. Converting an optical mode to a smaller optical mode may be used in applications such as converting an optical mode from a fiber to a chip. Mode converter 100 may be configured as shown or in any other suitable configuration as would be appreciated by one of ordinary skill in the art upon viewing this disclosure.

Cross-sectional graph 154 shows a cross-section of mode converter 100 along a first cut line AA' 150 and cross-sectional graph 160 shows a cross-section of mode converter 100 along a second cut line BB' 152. In cross-sectional graph 154, axis 156 indicates thickness in μm and axis 158 indicates width in μm. At first cut line AA' 150, silicon waveguide 104 has a width of about 0.5 μm and a thickness of about 0.2 μm, silicon dioxide ($SiO_2$) 106 has a width of about 0.5 μm and a thickness of about 0.01 μm, and silicon nitride ($Si_3N_4$) 108 has a width of about 0.5 μm and a thickness of about 0.1 μm. In cross-sectional graph 160, axis 162 indicates thickness in μm and axis 164 indicates width in μm. As shown, the width of silicon waveguide 104 reduces from cut line AA' to cut line BB' as described further below. At second cut line BB' 152, silicon waveguide 104 has a width of about 0.2 μm and a thickness of about 0.2 μm, silicon dioxide 106 has a width of about 0.2 μm and a thickness of about 0.01 μm, and silicon nitride 108 has a width of about 0.2 μm and a thickness of about 0.1 μm.

Mode converter 100 comprises silicon waveguide 104 disposed on the surface 102A of substrate 102. Substrate 102 may be formed of materials including, but not limited to, buried oxide (BOX) on silicon, silicon oxide, silicon dioxide ($SiO_2$), and oxides. Thickness is represented with respect to axis 194 into and out of the page.

Silicon waveguide 104 is adiabatically tapered from the first cut line AA' 150 to the second cut line BB' 152 such that the first cut line AA' 150 is wider than the second cut line BB' 152. Adiabatic tapering provides a slow tapering transition to allow smooth optical mode transferring. Width is represented with respect to axis 192 and length is represented with respect to axis 190. First cut line AA' 150 may be any suitable width. For example, the width of silicon waveguide 104 at the first cut line AA' 150 may be from about 300 nm to about 500 nm. The use of the term "about" means±10% of the subsequent number, unless otherwise stated. Second cut line BB' 152 has a smaller width than first cut line AA' 150. In an embodiment, second cut line BB' 152 is as narrow as fabrication processes allow. For example, second cut line BB' 152 may be about 130 nm or about 180 nm. Alternatively, second cut line BB' 152 may be any suitable width. Silicon waveguide 104 may be configured as shown or with any other suitable orientation, tapering, length, width, and/or thickness.

Silicon waveguide 104 is covered by hard mask that comprises silicon nitride 108 on top of silicon dioxide 106. Silicon dioxide 106 is disposed onto a top surface 104A of silicon waveguide 104. Silicon dioxide 106 is configured to at least partially cover the top surface 104A of silicon waveguide 104. In an embodiment, silicon dioxide 106 covers the entire top surface 104A of silicon waveguide 104. At least a portion of the sidewalls 104B of silicon waveguide 104 is not covered by silicon dioxide 106.

Silicon nitride 108 is disposed onto a top surface 106A of silicon dioxide 106. Silicon nitride 108 is configured to at least partially cover the top surface 106A of silicon dioxide 106. In an embodiment, silicon nitride 108 covers the entire top surface 106A of silicon dioxide 106. Examples of materials used for silicon nitride 108 include, but are not limited to, silicon nitride ($Si_3N_4$), tri-nitride, and nitrides.

Figure 2:
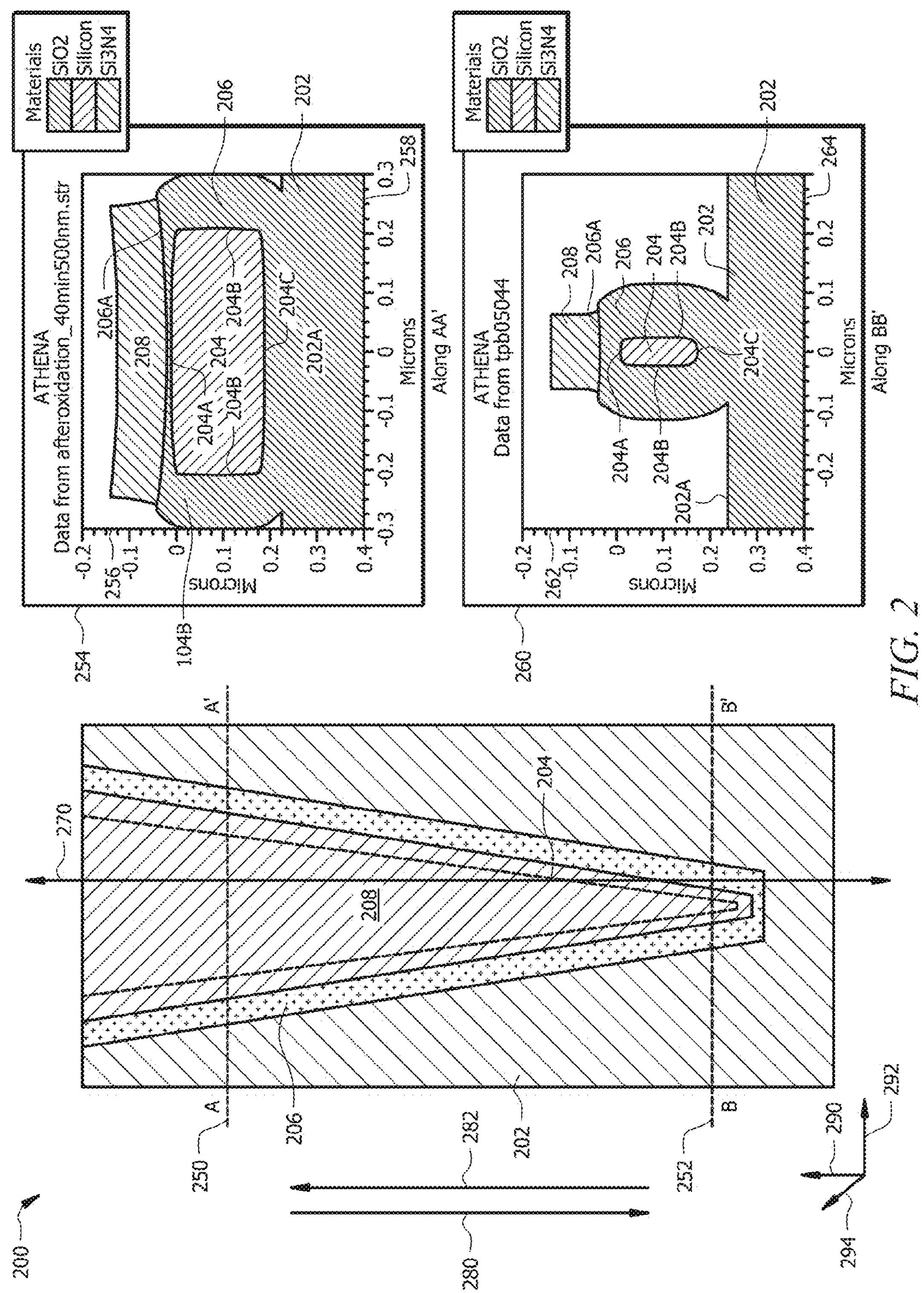
FIG. 2 is a top view of an embodiment of a mode converter after thermal oxidation.

FIG. 2 is a top view of an embodiment of a mode converter 200 after thermal oxidation. For example, thermal oxidation may comprise a 40 minute dry-thermal oxidation process at about 1,150 degrees Celsius (° C.). In an embodiment, oxidation may occur at a temperature of at least about 800° C. for at least two minutes. Alternatively, oxidation may be performed using any suitable technique, temperature, and time as would be appreciated by one of ordinary skill in the art upon viewing this disclosure. Mode converter 200 is configured to communicate light 270 along a silicon waveguide 204 and to transfer an optical mode of the light 270 between the silicon waveguide 204 and another waveguide (not shown). Mode coupler 200 is configured to transfer an optical mode in the first direction 280 to convert the optical mode to a larger optical mode. Mode coupler 200 is also configured to transfer the optical mode of light 270 in a second direction 282 to convert the optical mode to a smaller optical mode. Mode converter 200 may be configured as shown or in any other suitable configuration as would be appreciated by one of ordinary skill in the art upon viewing this disclosure.

Cross-sectional graph 254 shows a cross-section of mode converter 200 at a first cut line AA' 250 and cross-sectional graph 260 shows a cross-section of mode converter 200 at a second cut line BB' 252. In cross-sectional graph 254, axis 256 indicates thickness in μm and axis 258 indicates width in μm. At the first cut line AA' 250, silicon waveguide 204 has a width of about 0.4 μm and a thickness of about 0.18 μm, silicon dioxide 206 has a width of about 0.6 μm and a thickness of about 0.25 μm, and silicon nitride 208 has a width of about 0.55 μm and a thickness of about 0.13 μm. In cross-sectional graph 260, axis 262 indicates thickness in μm and axis 264 indicates width in μm. In cross-sectional graph 254, axis 256 indicates thickness in μm and axis 258 indicates width in μm. At the second cut line BB' 252, silicon waveguide 204 has a width of about 0.05 μm and a thickness of about 0.15 μm.

Mode converter 200 may be configured similarly to mode converter 100 in FIG. 1 before thermal oxidation. Mode converter 200 comprises silicon waveguide 204 disposed on the surface 202A of substrate 202. Substrate 202 is configured similarly to substrate 102 in FIG. 1. Thickness is represented with respect to axis 294 into and out of the page.

Silicon waveguide 204 is configured similarly to silicon waveguide 104 in FIG. 1. Silicon waveguide 204 is adiabatically tapered from the first cut line AA' 250 to the second cut line BB' 252 such that the first cut line AA' 250 is wider than the second cut line BB' 252. Width is represented with respect to axis 292 and length is represented with respect to axis 290. First cut line AA' 250 may be any suitable width. Second cut line BB' 252 has a smaller width than first cut line AA' 250. In an embodiment, second cut line BB' 252 is as narrow as fabrication processes allow. Alternatively, second cut line BB' 252 may be any suitable width. After thermal oxidation the height and/or width of silicon waveguide 204 may be reduced compared to silicon waveguide 104 in FIG. 1. For example, the thermal oxidation process may reduce the tip width of the silicon waveguide 204 from about 180 nm to about 60 nm or by about 50% to about 55%. Silicon waveguide 204 may be configured as shown or with any other suitable orientation, tapering, length, width, and/or thickness.

Silicon waveguide 204 is covered by hard mask that comprises silicon nitride 208 on top of silicon dioxide 206. Silicon dioxide 206 is configured similarly to silicon dioxide 106 in FIG. 1. After thermal oxidation, silicon dioxide 206 covers the top surface 204A, the sidewalls 204B, and the bottom surface 204C of silicon waveguide 204. Silicon dioxide 206 substantially encloses the silicon waveguide 204 within silicon dioxide 206. A portion of silicon dioxide 206 that covers the bottom surface 204C of silicon waveguide 204 becomes integrated with substrate 202.

Silicon nitride 208 is configured similarly to silicon nitride 108 in FIG. 1. Silicon nitride 208 is disposed onto a top surface 206A of silicon dioxide 206. In an embodiment, silicon nitride 208 can be removed from silicon dioxide 206 to allow for additional fabrication processes to be performed. Further processing may be performed on the silicon waveguide after thermal oxidation. For example, silicon nitride 208 may be removed and the whole silicon waveguide 204 is covered in oxide.

Figure 3:
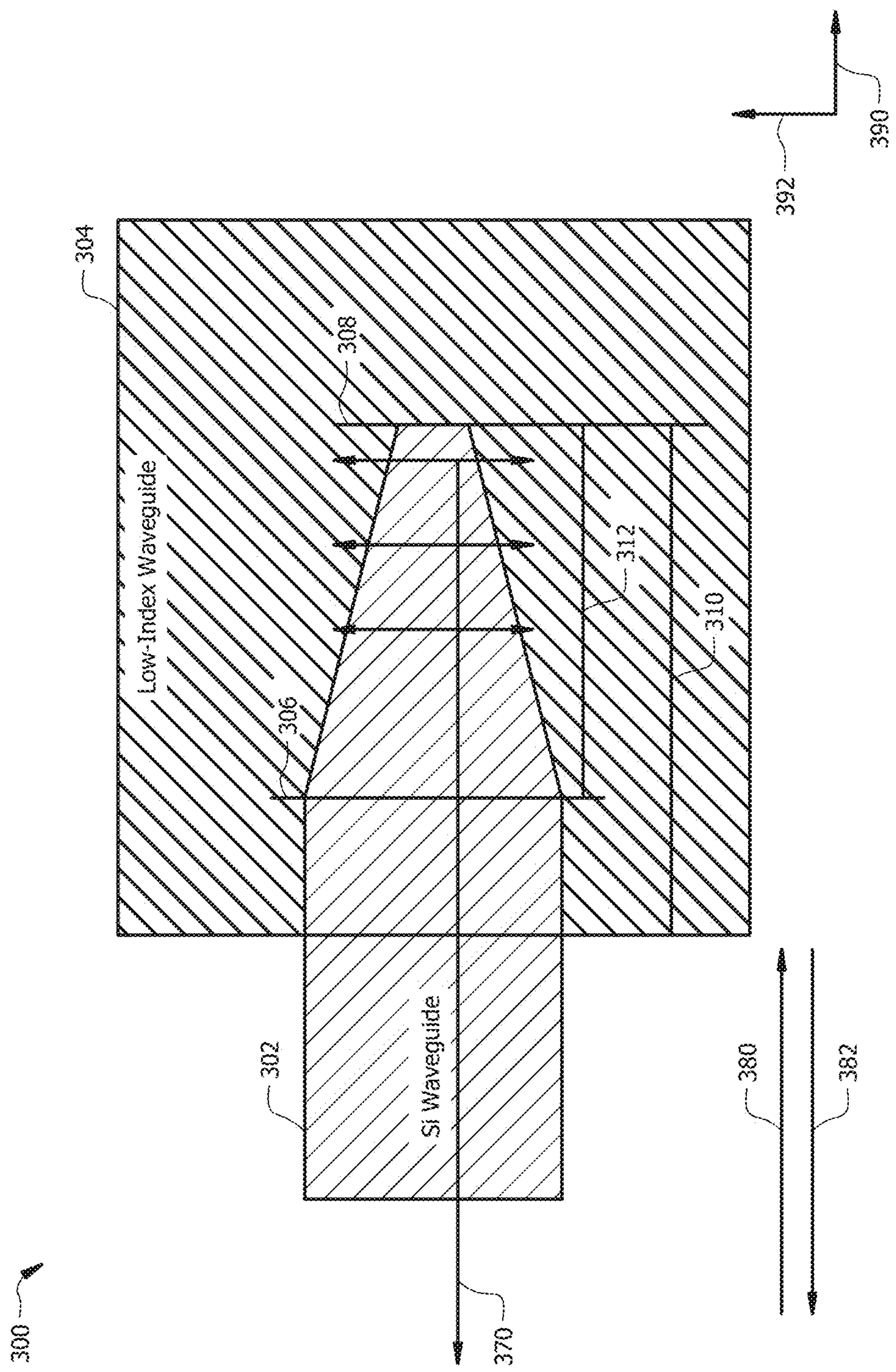
FIG. 3 is a schematic diagram of an embodiment of a mode converter configured to use mode coupling between a silicon waveguide and a low-index waveguide.

FIG. 3 is a schematic diagram of an embodiment of a mode converter 300 configured to use mode coupling between a silicon waveguide 302 and a low-index waveguide 304. Mode converter 300 is configured to communicate light 370 along the silicon waveguide 302 and to transfer an optical mode of the light 370 between the silicon waveguide 302 and the low-index waveguide 304. Light 370 is represented by an arrowed line, but may also include directions of propagation that are not explicitly shown. Mode coupler 300 is configured to transfer an optical mode in the first direction 380 to convert the optical mode to a larger optical mode. Mode coupler 300 is also configured to transfer the optical mode of light 370 in a second direction 382 to convert the optical mode to a smaller optical mode. Mode converter 300 may be configured as shown or in any other suitable configuration as would be appreciated by one of ordinary skill in the art upon viewing this disclosure.

Silicon waveguide 302 is configured similarly to silicon waveguide 104 in FIG. 1 and silicon waveguide 204 in FIG. 2. Silicon waveguide 302 is adiabatically tapered from the first location 306 to the second location 308 such that the first location 306 is wider than the second location 308. Width is represented with respect to axis 392 and length is represented with respect to axis 390. First location 306 may be any suitable width. Second location 308 has a smaller width than first location 306. In an embodiment, second location 308 is as narrow as fabrication processes allow. Alternatively, second location 308 may be any suitable width. Silicon waveguide 302 may be configured as shown or with any other suitable orientation, tapering, length, width, and/or thickness.

Low-index waveguide 304 may be a suspended oxide waveguide fabricated by removing a silicon substrate beneath a buried oxide (BOX) of the substrate (e.g., substrate 102 in FIG. 1). Examples of materials used to form the low-index waveguide 304 include, but are not limited to, silicon oxynitride (SiON), silicon-rich oxide ($SiO_x$), aluminum nitride (AlN), aluminum oxide ($Al_2O_3$), silicon carbide (SiC), or other suitable polymers. In an embodiment, low-index waveguide 304 is a cladding, for example, a silicon oxide cladding. Low-index waveguide 304 may have a width and/or thickness between about 1 μm to about 15 μm. Low-index waveguide 304 is a low-index waveguide and has a lower refractive index than silicon waveguide 302. Low-index waveguide 304 may have a refractive index in the range of about 1.4 to about 3.0. In an embodiment, at least a portion 310 of silicon waveguide 302 is disposed within low-index waveguide 304. For example, the adiabatic tapering 312 of silicon waveguide 302 is adjacent to low-index waveguide 304. Low-index waveguide 304 may partially or completely cover silicon waveguide 302. The amount of optical mode from light 370 that transfers between silicon waveguide 302 and low-index waveguide 304 is proportional to the ratio of the cross-sectional area of silicon waveguide 302 and the cross-sectional area of low-index waveguide 304 at a given location, for example, at the first location 306 or the second location 308 of silicon waveguide 302.

Figure 4:
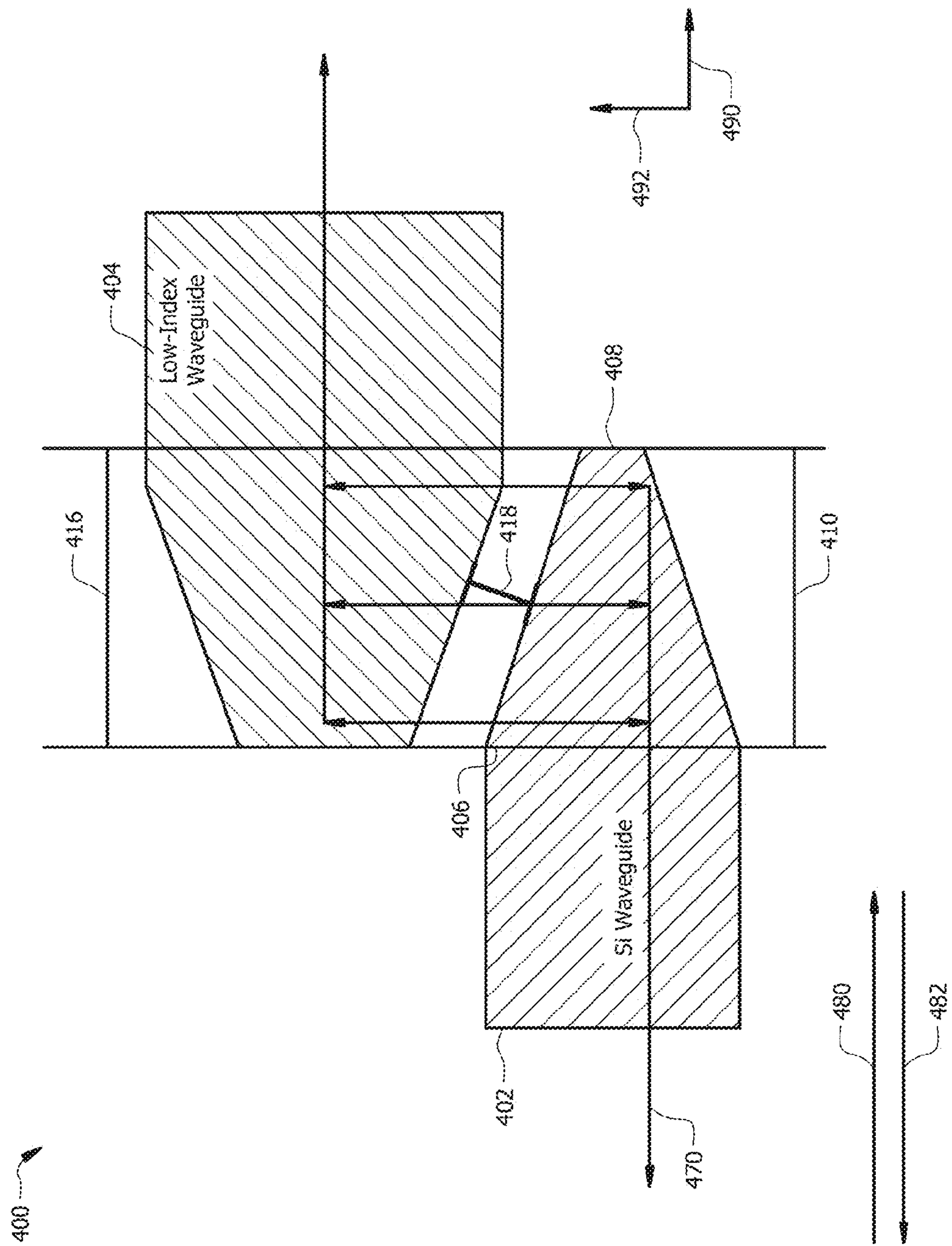
FIG. 4 is a schematic diagram of an embodiment of a mode converter configured to use mode coupling between adiabatic tapers.

FIG. 4 is a schematic diagram of an embodiment of a mode converter 400 configured to use mode coupling between adiabatic tapers. Mode converter 400 is configured to communicate light 470 along a silicon waveguide 402 and to transfer an optical mode of the light 470 between the silicon waveguide 402 and a low-index waveguide 404. Light 470 is represented by an arrowed line, but may also include directions of propagation that are not explicitly shown. Mode coupler 400 is configured to transfer an optical mode in the first direction 480 to convert the optical mode to a larger optical mode of light 470. Mode coupler 400 is also configured to transfer the optical mode of light 470 in a second direction 482 to convert the optical mode to a smaller optical mode. Mode converter 400 may be configured as shown or in any other suitable configuration as would be appreciated by one of ordinary skill in the art upon viewing this disclosure.

Mode converter 400 is configured such that at least a portion of an adiabatic tapering 410 of silicon waveguide 402 and at least a portion of an adiabatic tapering 416 of low-index waveguide 404 are adjacent to each other. Gap 418 between silicon waveguide 402 and low-index waveguide 404 is substantially constant. The width of gap 418 may vary from about 50 nm to about 1 μm. Gap 418 may be filled with air, a cladding, or a second low-index material. In an alternative embodiment, silicon waveguide 402 and low-index waveguide 404 are in direct contact with each other and there is no gap between silicon waveguide 402 and low-index waveguide 404. Mode converter 400 may be configured as shown or in any other suitable configuration as would be appreciated by one of ordinary skill in the art upon viewing this disclosure.

Silicon waveguide 402 is configured similarly to silicon waveguide 104 in FIG. 1 and silicon waveguide 204 in FIG. 2. Silicon waveguide 402 is adiabatically tapered from a first location 406 to a second location 408 such that silicon waveguide 402 is wider at the first location 406 than at the second location 408. Width is represented with respect to axis 492 and length is represented with respect to axis 490. At the first location 406, silicon waveguide 402 may be any suitable width. At the second location 408, silicon waveguide 402 has a smaller width than at first location 406. In an embodiment, silicon waveguide 402 is as narrow as fabrication processes allow at the second location 408. Alternatively, silicon waveguide 402 may be any suitable width at the second location 408. Silicon waveguide 402 may be configured as shown or with any other suitable orientation, tapering, length, width, and/or thickness.

Low-index waveguide 404 may be configured similarly to low-index waveguide 304 in FIG. 3. Low-index waveguide 404 is adiabatically tapered from the first location 406 to the second location 408 such that low-index waveguide 404 is wider at the second location 408 than at the first location 406. At the first location 406, low-index waveguide 404 has a smaller width than at the second location 408. In an embodiment, low-index waveguide 404 is as narrow as fabrication processes allow at the first location 406. Alternatively, low-index waveguide 404 may be any suitable width at the first location 406. At the second location 408, low-index waveguide 404 may be any suitable width. Low-index waveguide 404 may be configured as shown or with any other suitable orientation, tapering, length, width, and/or thickness.

Figure 5:
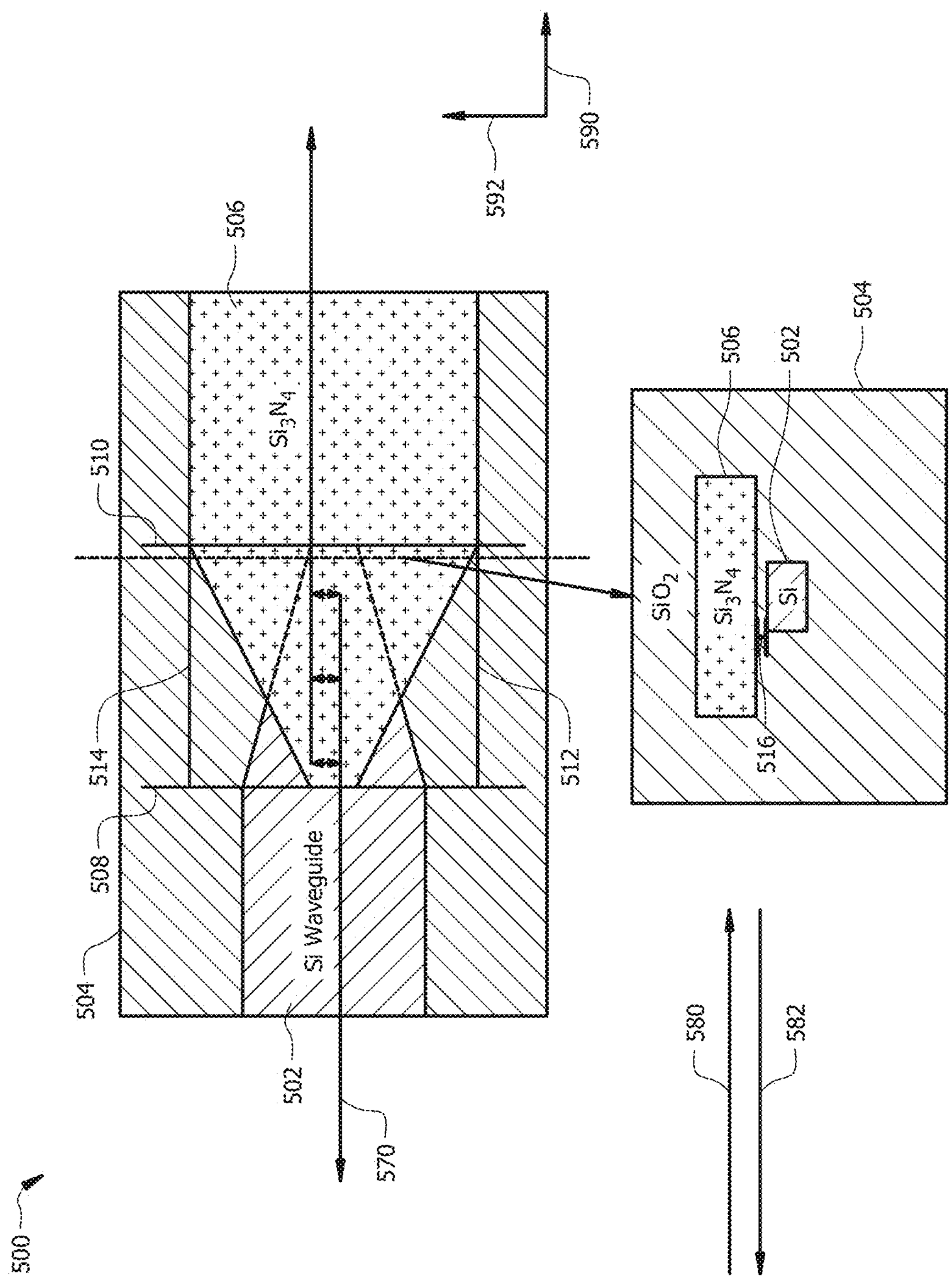
FIG. 5 is a schematic diagram of an embodiment of a mode converter configured to use mode coupling between a silicon waveguide and a second waveguide.

FIG. 5 is a schematic diagram of an embodiment of a mode converter 500 configured to use mode coupling between a silicon waveguide 502 and a second waveguide 506. Mode converter 500 is configured to communicate light 570 along the silicon waveguide 502 and to transfer an optical mode of the light 570 between the silicon waveguide 502 and the second waveguide 506. Light 570 is represented by an arrowed line, but may also include directions of propagation that are not explicitly shown. Mode coupler 500 is configured to transfer an optical mode in the first direction 580 to convert the optical mode to a larger optical mode. Mode coupler 500 is also configured to transfer the optical mode of light 570 in a second direction 582 to convert the optical mode to a smaller optical mode. Mode converter 500 may be configured as shown or in any other suitable configuration as would be appreciated by one of ordinary skill in the art upon viewing this disclosure.

Mode converter 500 is configured such that at least a portion of an adiabatic tapering 512 of silicon waveguide 502 and at least a portion of an adiabatic tapering 514 of second waveguide 506 are adjacent to each other and overlap with each other on a substrate 504. For example, silicon waveguide 502 may be positioned above or below (as shown in FIG. 5) the second waveguide 506. Substrate 504 may be configured similarly to substrate 102 in FIG. 1. In an embodiment, silicon waveguide 502 and the second waveguide 506 are separated from each other by a gap 516. Gap 516 may be filled with silicon dioxide. Gap 516 may be any suitable distance as would be appreciated by one of ordinary skill in the art. Alternatively, silicon waveguide 502 may be in direct contact with second waveguide 506. Mode converter 500 may be configured as shown or in any other suitable configuration as would be appreciated by one of ordinary skill in the art upon viewing this disclosure.

Silicon waveguide 502 is configured similarly to silicon waveguide 104 in FIG. 1 and silicon waveguide 204 in FIG. 2. Silicon waveguide 502 is adiabatically tapered from a first location 508 to a second location 510 such that silicon waveguide 502 is wider at the first location 508 than at the second location 510. Width is represented with respect to axis 592 and length is represented with respect to axis 590. At the first location 508, silicon waveguide 502 may be any suitable width. At the second location 510, silicon waveguide 502 has a smaller width than at first location 508. In an embodiment, silicon waveguide 502 is as narrow as fabrication processes allow at the second location 510. Alternatively, silicon waveguide 502 may be any suitable width at the second location 510. Silicon waveguide 502 may be configured as shown or with any other suitable orientation, tapering, length, width, and/or thickness.

Examples of materials used for the second waveguide 506 include, but are not limited to, silicon oxide, silicon nitride ($Si_3N_4$), and silicon oxynitride ($SiO_xN_y$). Second waveguide 506 is adiabatically tapered from first location 508 to second location 510 such that the second waveguide 506 is wider at the second location 510 than at the first location 508. At the first location 508, the second waveguide 506 has a smaller width than at the second location 510. In an embodiment, the second waveguide 506 is as narrow as fabrication processes allow at the first location 508. Alternatively, the second waveguide 506 may be any suitable width at the first location 508. At the second location 510, the second waveguide 506 may be any suitable width. The second waveguide 506 may be configured as shown or with any other suitable orientation, tapering, length, width, and/or thickness.

Figure 6:
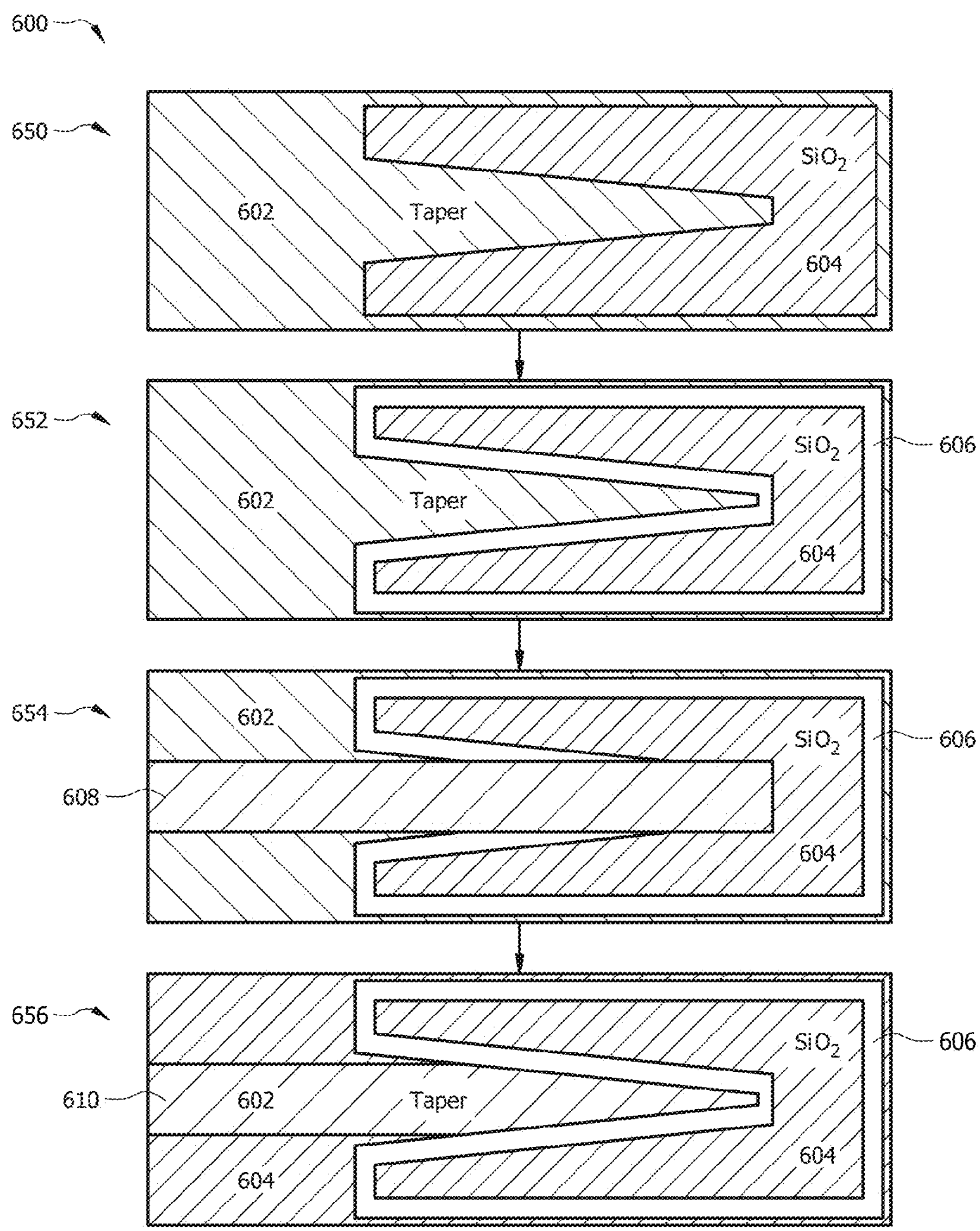
FIG. 6 is a schematic diagram of an embodiment of a mode converter fabrication process.

FIG. 6 is a schematic diagram of an embodiment of a mode converter fabrication process 600. Mode converter fabrication process 600 is configured to generate a silicon waveguide for a mode converter using a silicon waveguide taper first integration process. At step 650, a silicon-on-insulator (SOI) substrate 604 that comprises a silicon layer on a BOX layer is obtained. A first hard mask 602 is deposited onto the SOI substrate 604. The first hard mask 602 comprises a silicon nitride layer on top of a silicon dioxide layer and is deposited such that the silicon dioxide layer covers a top surface of the silicon layer and forms a layer between the silicon layer and the silicon nitride layer. The silicon layer and the first hard mask 602 experience one or more fabrication processes (e.g., photolithography and etching) to form structures, for example, waveguides, out of the silicon layer. Following the one or more fabrication processes, the silicon layer comprises a tapered portion. At least a portion of one of the sidewalls of the silicon layer are not covered by the hard mask 602. The silicon layer, the silicon dioxide layer, and the silicon nitride layer may be configured similarly to silicon waveguide 104, silicon dioxide 106, and silicon nitride 108 in FIG. 1, respectively. The first hard mask 602 may be fabricated using any suitable material and fabrication process techniques. At step 652, thermal oxidation is performed on the silicon layer and the first hard mask 602. Thermal oxidation may be performed using any suitable fabrication process techniques as would be appreciated by one of ordinary skill in the art upon viewing this disclosure. After thermal oxidation, the silicon layer, the silicon dioxide layer, and the silicon nitride layer may be configured similarly to silicon waveguide 204, silicon dioxide 206, and silicon nitride 208 in FIG. 2, respectively. Silicon dioxide 606 covers the top surface, the sidewalls, and the bottom surface of the silicon layer. The silicon dioxide layer substantially encloses the silicon layer within silicon dioxide layer. A portion of silicon dioxide layer that covers the bottom surface of silicon layer becomes integrated with SOI substrate 604. At step 654, a second hard mask or photoresist 608 is fabricated onto the first hard mask 602 to define a silicon waveguide 610. The second hard mask 608 is fabricated using any suitable material and fabrication process techniques as would be appreciated by one of ordinary skill in the art upon viewing this disclosure. At step 656, a silicon waveguide 610 is processed (e.g., etched) and second hard mask 608 is removed. Additional structures may be patterned and fabricated, as needed.

Figure 7:
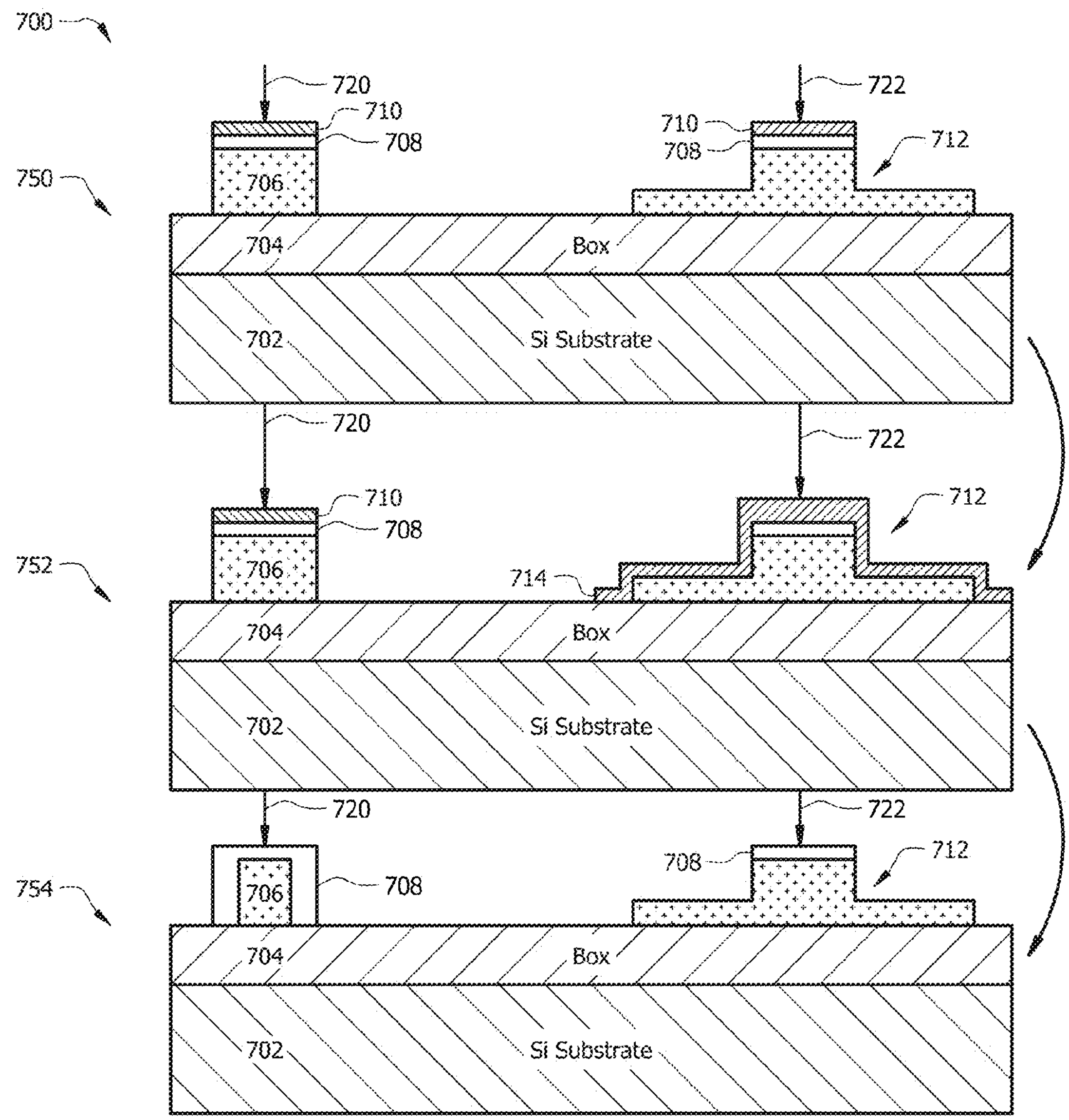
FIG. 7 is a schematic diagram of another embodiment of a mode converter fabrication process.

FIG. 7 is a schematic diagram of another embodiment of a mode converter fabrication process 700. Mode converter fabrication process 700 is configured to generate a silicon waveguide using a silicon waveguide pattern first integration process. At step 750, an SOI substrate is obtained that comprises a silicon substrate 702 and a silicon layer 706 and a BOX layer 704 covering at least a portion of the silicon substrate 702. The silicon substrate 702 and the BOX layer 704 may together be referred to as a substrate. A first hard mask is deposited onto the silicon layer 706. The first hard mask comprises a silicon nitride layer 710 and a silicon dioxide layer 708 and is deposited such that the silicon dioxide layer 708 covers a top surface of the silicon layer 706 and forms a layer between the silicon layer 706 and the silicon nitride layer 710. The silicon layer 706 and the first hard mask experience one or more fabrication processes (e.g., photolithography and etching) to form structures out of the silicon layer 706. Following the one or more fabrication processes, the silicon layer 706 comprises a tapered portion at a first location 720 on the BOX layer 704. At least one of the sidewalls of the silicon waveguide 706 is not covered by the first hard mask. The silicon layer 706, the silicon dioxide layer 708, and the silicon nitride layer 710 may be configured similarly to silicon waveguide 104, silicon dioxide 106, and silicon nitride 108 in FIG. 1, respectively. Similarly, a second waveguide 712 is formed at a second location 722 on the BOX layer 704. In an embodiment, the second waveguide comprises a silicon layer 706, a silicon dioxide layer 708, and a silicon nitride layer 710. The combination of the silicon nitride layer 710 on top of the silicon dioxide layer 708 forms a first hard mask for the second waveguide. Alternatively, the second waveguide may comprise any suitable materials as would be appreciated by one of ordinary skill in the art upon viewing this disclosure. At step 752, a second hard mask 714 is deposited onto the second waveguide 712. The second hard mask 714 encapsulates the second waveguide 712 and protects the second waveguide 712 from one or more fabrication processes. In an embodiment, the second mask 714 comprises additional silicon nitride material.

At step 754, thermal oxidation is performed using any suitable fabrication process techniques. After thermal oxidation, the silicon layer 706, the silicon dioxide layer 708, and the silicon nitride layer 710 may be configured similarly to silicon waveguide 204, silicon dioxide 206, and silicon nitride 208 in FIG. 2, respectively. The silicon dioxide layer 708 covers the top surface, the sidewalls, and the bottom surface of the silicon layer 706. The silicon dioxide layer 708 substantially enclosed the silicon layer 706 within silicon dioxide layer 708. A portion of silicon dioxide layer 708 that covers the bottom surface of silicon layer 706 becomes integrated with BOX layer 704. The silicon nitride layer 710 may be removed using any suitable fabrication processing technique, for example, nitride wet etching. The first hard mask 710 and the second hard mask 714 may also be removed from the second waveguide 712 using any suitable fabrication processing technique.

Figure 8:
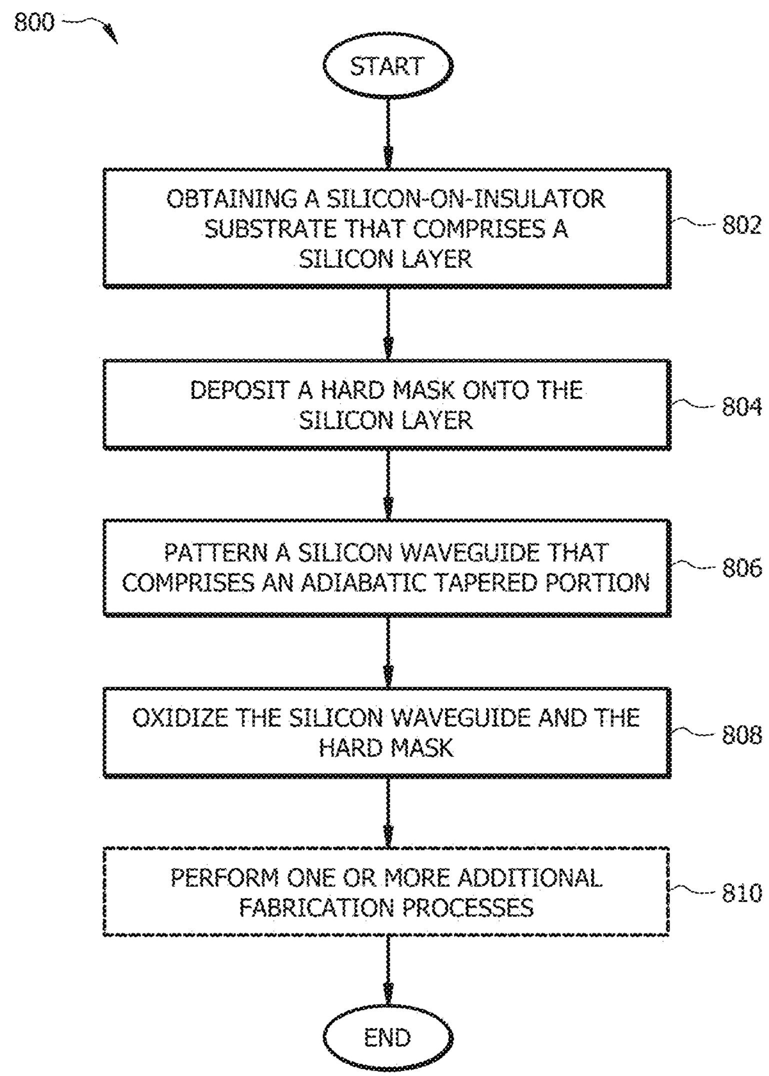
FIG. 8 is a flowchart of an embodiment of a mode converter fabrication method.

FIG. 8 is a flowchart of an embodiment of a mode converter fabrication method 800 for a mode converter. The mode converter may comprise a silicon waveguide configured similarly to silicon waveguide 104 in FIG. 1, silicon waveguide 204 in FIG. 2, silicon waveguide 302 in FIG. 3, silicon waveguide 402 in FIG. 4, and silicon waveguide 502 in FIG. 5. Mode converter fabrication method 800 can be implemented to produce a silicon waveguide with a small tip that can be used to convert between a small-size mode and a large-size mode while reducing coupling losses. At step 802, an SOI substrate that comprises a silicon layer on a BOX layer is obtained. At step 804, a hard mask is deposited onto the silicon layer. The hard mask comprises a silicon nitride layer on top of a silicon dioxide layer. The silicon dioxide layer and the silicon nitride layer may be configured similarly to silicon dioxide 106 and silicon nitride 108 in FIG. 1. At step 806, a silicon waveguide is patterned. The silicon waveguide comprises an adiabatic tapering and may be configured similarly to silicon waveguide 104 in FIG. 1, silicon waveguide 302 in FIG. 3, silicon waveguide 402 in FIG. 4, and silicon waveguide 502 in FIG. 5. At least a portion of the sidewalls of the silicon waveguide is not covered by the hard mask. For example, at least one sidewall is not covered by the hard mask. The silicon dioxide layer may be configured similarly to silicon dioxide 104 in FIG. 1. At step 808, the silicon waveguide and the hard mask are oxidized, for example, using thermal oxidation. After oxidation, the silicon waveguide, the silicon dioxide layer, and the silicon nitride layer may be configured similarly to silicon waveguide 204, silicon dioxide 206, and silicon nitride 208 in FIG. 2, respectively. The silicon dioxide layer covers the top surface, the sidewalls, and the bottom surface of the silicon waveguide. The silicon dioxide layer substantially enclosed the silicon waveguide within silicon dioxide layer. A portion of silicon dioxide layer that covers the bottom surface of silicon waveguide becomes integrated with the SOI substrate. At step 810, one or more fabrication process may be performed. Examples of additional fabrication processes include, but are not limited to, removing the hard mask, depositing a second hard mask, etching, and fabricating a second waveguide.

Figure 9A:
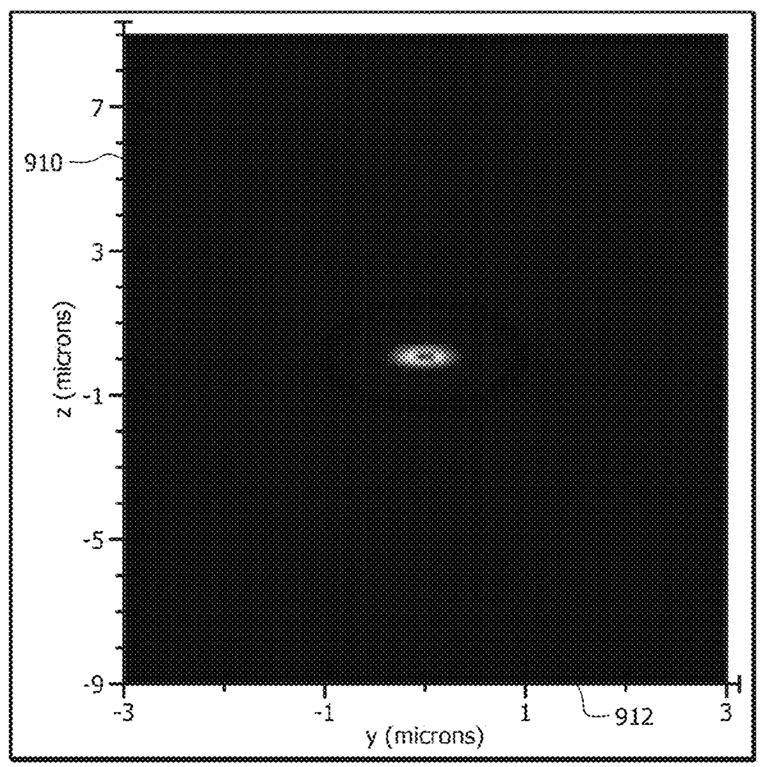
FIGS. 9A-9D shows energy density graphs along cross sections for a silicon waveguide tip and a low-index waveguide before oxidation.

FIGS. 9A-9D shows energy density graphs along cross sections of a silicon waveguide tip and a low-index waveguide before thermal oxidation. FIG. 9A is shows energy density graph for a transverse electric (TE) mode of a cross-section of a silicon waveguide tip. The silicon waveguide tip may be configured similarly to silicon waveguide 302 in FIG. 3. In FIG. 9A, axis 910 indicates an energy density distribution along a vertical axis z (e.g., axis 190 in FIG. 1) in μm and axis 912 indicates an energy density distribution along a horizontal axis y (e.g., axis 192 in FIG. 1) in μm.

Figure 9B:
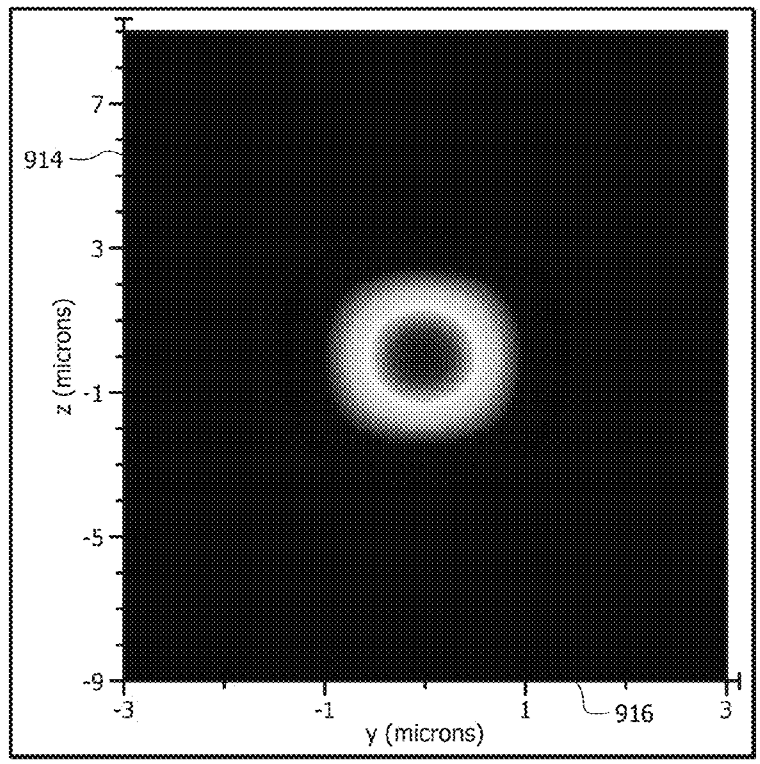

FIG. 9B shows an energy density graph for a TE mode of a cross-section of a low-index waveguide. The low-index waveguide may be configured similarly to low-index waveguide 304 in FIG. 3. In FIG. 9B, axis 914 indicates an energy density distribution along a vertical axis z in μm and axis 916 indicates an energy density distribution along a horizontal axis y in μm. The loss due to a TE mode mismatch between the silicon waveguide tip and the low-index waveguide is about −1.5 decibels (dB).

Figure 9C:
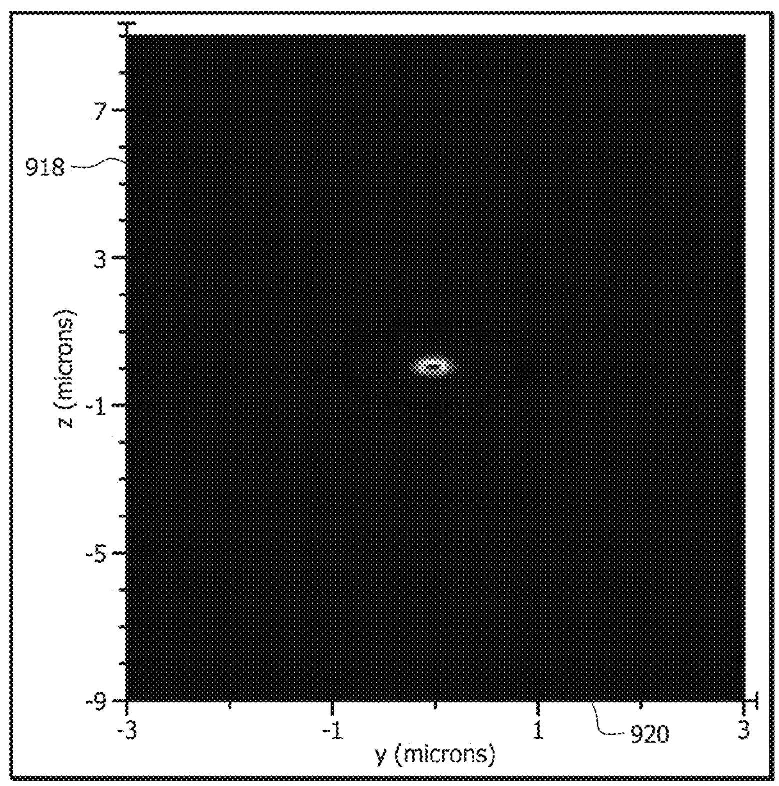

FIG. 9C shows an energy density graph for a transverse magnetic (TM) mode of a cross-section of the silicon waveguide tip. In FIG. 9C, axis 918 indicates an energy density distribution along a vertical axis z in μm and axis 920 indicates an energy density distribution along a horizontal axis y in μm.

Figure 9D:
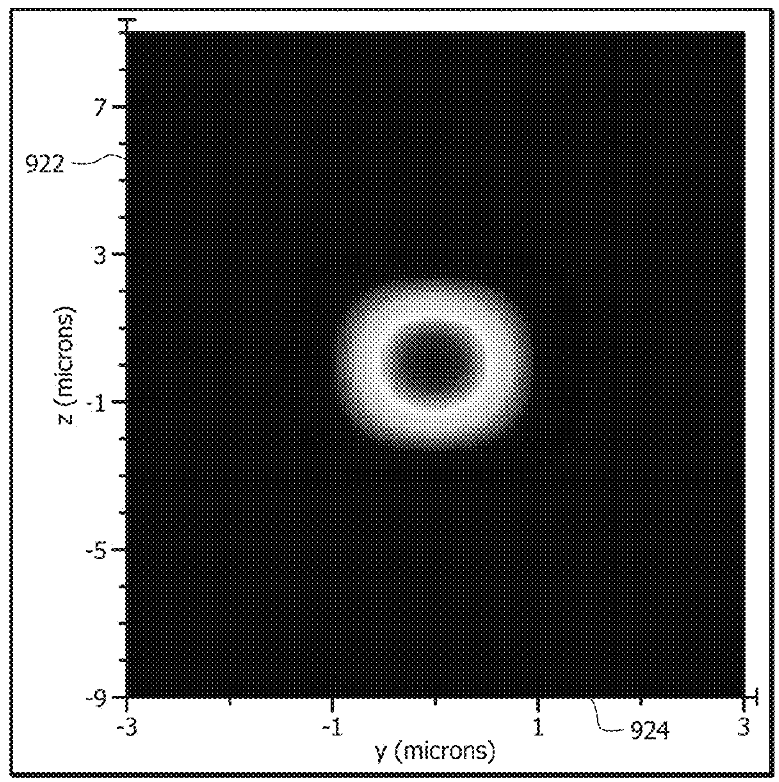

FIG. 9D shows an energy density graph for a TM mode of a cross-section of the low-index waveguide. In FIG. 9D, axis 922 indicates an energy density distribution along a vertical axis z in μm and axis 924 indicates an energy density distribution along a horizontal axis y in μm. The loss due to a TM mode mismatch between the silicon waveguide tip and the low-index waveguide is about −2.2 dB.

Figure 10A:
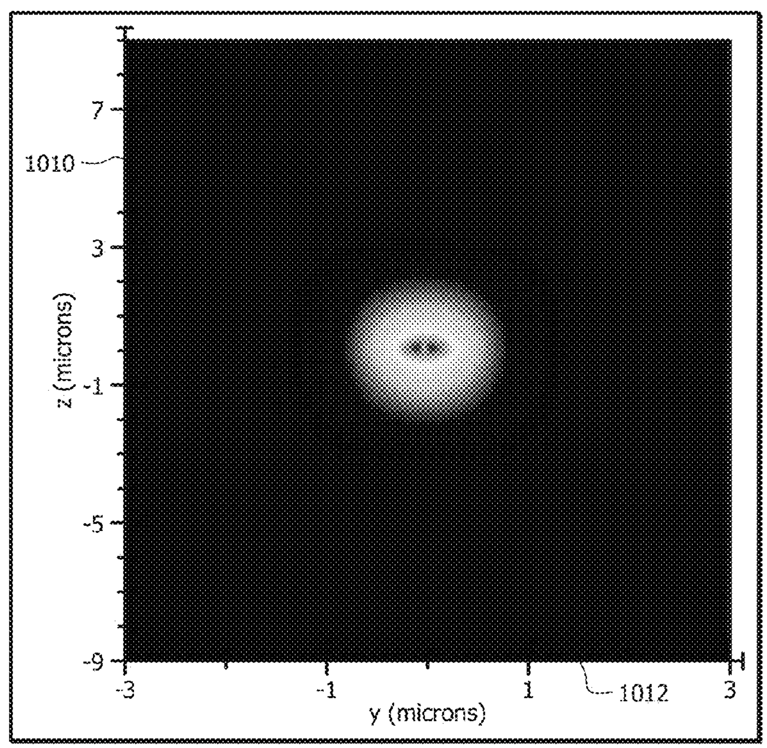
FIGS. 10A-10D shows energy density graphs along cross sections for a silicon waveguide tip and a low-index waveguide after thermal oxidation.

FIGS. 10A-10D shows energy density graphs along cross sections for a silicon waveguide tip and a low-index waveguide after thermal oxidation. FIG. 10A shows an energy density graph for a TE mode of a cross-section of a silicon waveguide tip. The silicon waveguide tip may be configured similarly to silicon waveguide 302 in FIG. 3. In energy density graph 1000A, axis 1010 indicates an energy density distribution along a vertical axis z (e.g., axis 190 in FIG. 1) in μm and axis 1012 indicates an energy density distribution along a horizontal axis y (e.g., axis 192 in FIG. 1) in μm.

Figure 10B:
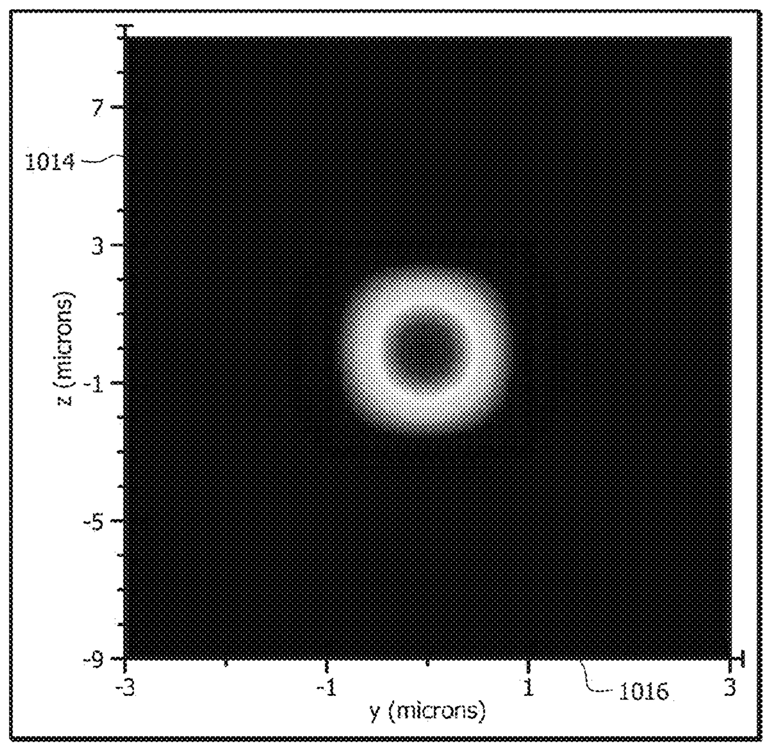

FIG. 10B shows an energy density graph for a TE mode of a cross-section of a low-index waveguide. The low-index waveguide may be configured similarly to low-index waveguide 304 in FIG. 3. In FIG. 10B, axis 1014 indicates an energy density distribution along a vertical axis z in μm and axis 1016 indicates an energy density distribution along a horizontal axis y in μm. The loss due to a TE mode mismatch between the silicon waveguide tip and the low-index waveguide is about −0.01 dB. As such, the loss due to a TE mode mismatch is reduced after thermal oxidation when compared to the losses before thermal oxidation.

Figure 10C:
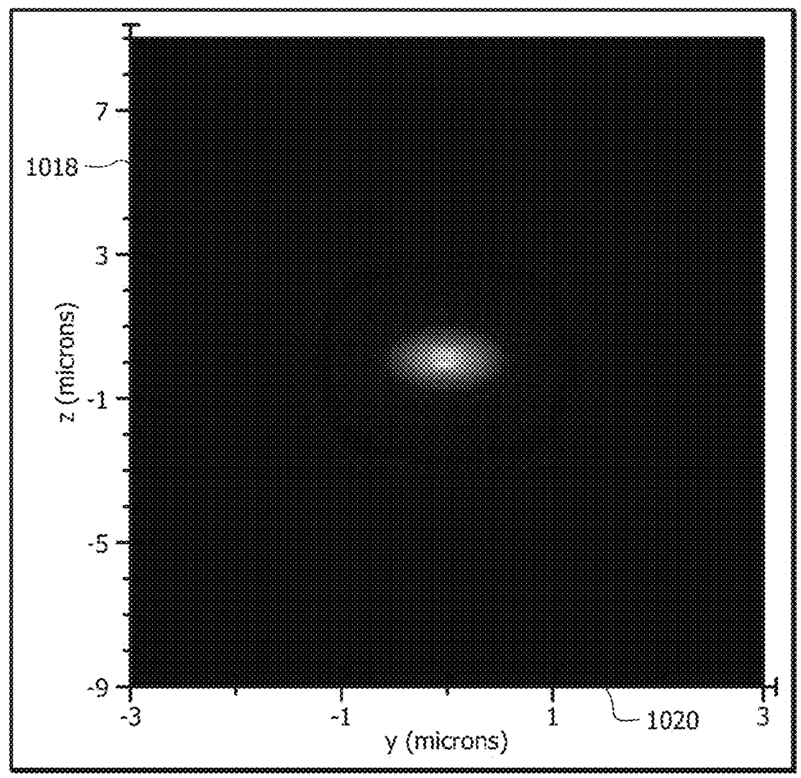

FIG. 10C shows an energy density graph for a TM mode of a cross-section of the silicon waveguide tip. In FIG. 10C, axis 1018 indicates an energy density distribution along a vertical axis z in μm and axis 1020 indicates an energy density distribution along a horizontal axis y in μm.

Figure 10D:
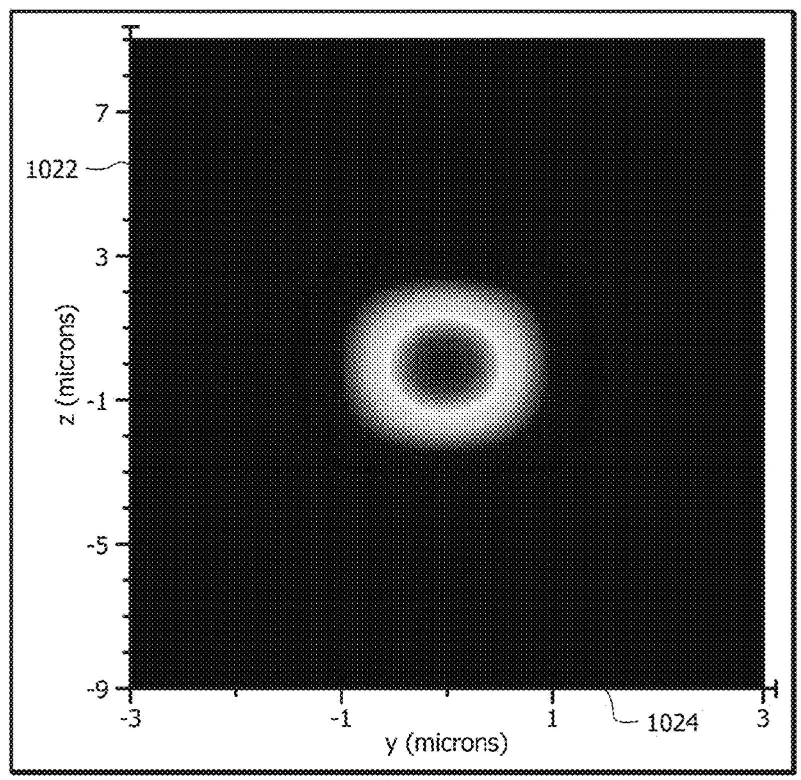

FIG. 10D shows an energy density graph for a TM mode of a cross-section of the low-index waveguide. In FIG. 10D, axis 1022 indicates an energy density distribution along a vertical axis z in μm and axis 1024 indicates an energy density distribution along a horizontal axis y in μm. The loss due to a TM mode mismatch between the silicon waveguide tip and the low-index waveguide is about −0.15 dB. As such, the loss due to a TM mode mismatch is also reduced after thermal oxidation when compared to the losses before thermal oxidation.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:

a substrate;

a silicon dioxide ($SiO_2$) material disposed on top of the substrate;

a silicon waveguide comprising a first adiabatic tapering and fully enclosed in the silicon dioxide material; and a low-index waveguide disposed on top of the substrate and adjacent to the first adiabatic tapering with respect to the substrate so that no portion of the silicon waveguide is between the low-index waveguide and the substrate, wherein the low-index waveguide comprises a second adiabatic tapering, wherein the first adiabatic tapering is adjacent to the second adiabatic tapering, wherein a first width of the first adiabatic tapering is widest at a first location along the substrate, and wherein a second width of the second adiabatic tapering is narrowest at the first location.

2. The apparatus of claim 1, wherein the silicon dioxide material is integrated with the substrate.

3. The apparatus of claim 1, wherein the silicon dioxide material is separated from the low-index waveguide by air.

4. The apparatus of claim 1, wherein the silicon dioxide material is separated from the low-index waveguide by a low-index material.

5. The apparatus of claim 1, wherein the silicon waveguide is oxidized with the silicon dioxide material.

6. The apparatus of claim 1, wherein the low-index waveguide comprises at least one of silicon dioxide, silicon nitride ($Si_3N_4$), silicon-rich oxide ($SiO_x$), aluminum oxide ($Al_2O_3$), and silicon carbide (SiC).

7. The apparatus of claim 1, wherein the substrate is a silicon-on-insulator (SOI).

8. The apparatus of claim 1, wherein at least a first portion of the first adiabatic tapering is separated from at least a second portion of the second adiabatic tapering by a substantially constant gap.

9. The apparatus of claim 8, wherein the gap is between 50 nanometers (nm) and 1 micrometer (μm).

10. The apparatus of claim 1, wherein at least a first portion of the first adiabatic tapering and at least a second portion of the second adiabatic tapering abut each other.

11. The apparatus of claim 1, wherein the silicon dioxide material is separated from the low-index waveguide by a cladding.

12. The apparatus of claim 1, wherein the silicon waveguide comprises a first refractive index, wherein the low-index waveguide comprises a second refractive index, and wherein the second refractive index is lower than the first refractive index.

13. The apparatus of claim 12, wherein the first refractive index is greater than 3.

14. The apparatus of claim 13, wherein the second refractive index is between about 1.4 and 3.

15. The apparatus of claim 1, wherein the silicon dioxide material forms part of a hard mask configured to facilitate tip width reduction of the silicon waveguide via thermal oxidation.

16. An apparatus comprising:

a substrate;

a silicon dioxide ($SiO_2$) material disposed on top of the substrate;

a silicon waveguide comprising a first adiabatic tapering and fully enclosed in the silicon dioxide material; and a low-index waveguide disposed on top of the substrate and adjacent to the first adiabatic tapering with respect to the substrate so that no portion of the silicon waveguide is between the low-index waveguide and the substrate, wherein the low-index waveguide comprises a second adiabatic tapering, wherein the first adiabatic tapering is adjacent to the second adiabatic tapering, wherein a first width of the first adiabatic tapering is narrowest at a second location along the substrate, and wherein a second width of the second adiabatic tapering is widest at the second location.

17. An apparatus comprising:

a substrate;

a silicon dioxide ($SiO_2$) material disposed on top of the substrate;

a silicon waveguide comprising a first adiabatic tapering and fully enclosed in the silicon dioxide material; and a low-index waveguide disposed on top of the substrate and adjacent to the first adiabatic tapering with respect to the substrate so that no portion of the silicon waveguide is between the low-index waveguide and the substrate, wherein the low-index waveguide comprises a second adiabatic tapering, wherein the first adiabatic tapering is adjacent to the second adiabatic tapering, wherein a first width of the first adiabatic tapering is greater than 0.4 micrometers (μm) at a first location along the substrate and is between about 50 nanometers (nm) and 60 nm at a second location along the substrate, and wherein a second width of the second adiabatic tapering is about 1 μm at the first location and is 15 μm or greater at the second location.

18. The apparatus of claim 17, wherein a first thickness of the silicon waveguide is about 0.18 μm at the first location and about 0.15 μm at the second location, and wherein a second thickness of the silicon waveguide is between about 1 μm and about 15 μm at the first location and the second location.

* * * * *